United States Patent Office 3,457,260
Patented July 22, 1969

3,457,260
BASIC METHINE DYESTUFFS CONTAINING A HYDRAZINIUM GROUP
Roland Entschel and Curt Mueller, Basel, and Walter Wehrli, Riehen, Switzerland, assignors to Sandoz Ltd. (also known as Sandoz AG), Basel, Switzerland
No Drawing. Continuation of application Ser. No. 306,321, Sept. 3, 1963, which is a continuation-in-part of applications Ser. Nos. 188,837 and 188,889, Apr. 19, 1962, and applications Ser. Nos. 250,787, 250,788, and 250,789, Jan. 11, 1963. This application Oct. 6, 1966, Ser. No. 585,717
Claims priority, application Switzerland, Apr. 21, 1961, 4,709/61; Jan. 12, 1962, 359/62; Apr. 24, 1962, 4,898/62
Int. Cl. C09b 23/10
U.S. Cl. 260—240.9      2 Claims

ABSTRACT OF THE DISCLOSURE
Basic methine dyestuffs of the type of

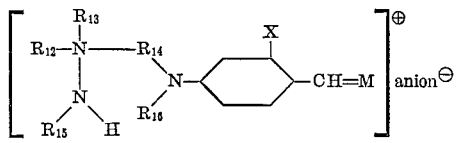

(as hereinafter further defined) are suitable for dyeing a wide variety of materials such as polyacrylonitrile fabric to produce dyeings with good all-around properties.

---

The present invention is a continuation-in-part application to our copending applications Ser. No. 188,837, filed on Apr. 19, 1962 (now U.S. Patent No. 3,254,967, granted May 24, 1966); Ser. No. 188,889, filed on Apr. 19, 1962; Ser. No. 250,787, filed on Jan. 11, 1963 now abandoned; Ser. No. 250,788, filed on Jan. 11, 1963 now abandoned; Ser. No. 250, 789, filed on Jan. 11, 1963 now abandoned and relates to basic methine dyestuffs containing a hydrazinium group.

This invention relates to basic dyestuffs of the formula

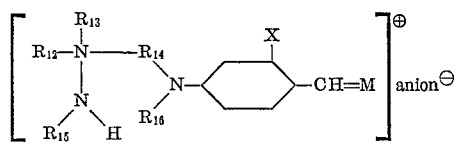

(I)

wherein
X is a member selected from the group consisting of a hydrogen atom, lower alkyl, lower alkoxy and a halogen atom,
$R_{12}$ taken alone is lower alkyl,
$R_{13}$ taken alone is lower alkyl,
$R_{12}$ and $R_{13}$ taken together with the adjacent N-atom represent 1,2,4-triazolo, pyrrolidino, piperidino or morpholino,
$R_{14}$ is lower alkylene,
$R_{15}$ is a member selected from the group consisting of a hydrogen atom and lower alkyl,
$R_{16}$ is lower alkyl, and
M is

wherein
$R_1$ taken alone is a member selected from the group consisting of H, —CN and —CO—$CH_3$,
$R_2$ taken alone is a member selected from the group consisting of —CN, —COO—$CH_3$, —COO—$C_2H_4$—CN,

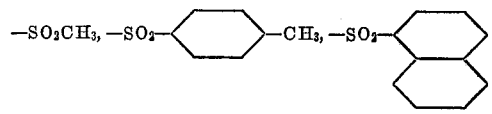

and 1,3,3-trimethylindoleninium, and $R_1$ and $R_2$ together with the adjacent carbon atom represent pyrazolonyl,

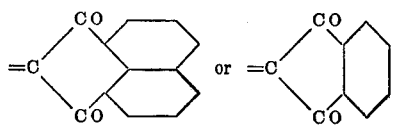

These new dyes (I) can conveniently be prepared by replacing, or converting, n substituents Z in a compound of the formula

(II)

by, or into, n groups of the formula

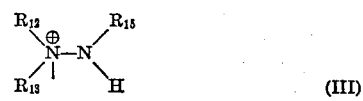

(III)

wherein B represents the methine dyestuff radical or the radical of a compound capable of the formation of the methine dyestuff radical, and Z a substituent which can be replaced by, or converted into, a gorup of Formula III; upon which the reaction product is converted into a dye in cases where B represents the radical of a compound capable of the formation of a dye of the Formula I.

A preferred mode of operation of the present process for the production of new basic dyes consists in reacting 1 mole of a compound of the formula

wherein E represents the acid radical of an ester, with $n$ moles of a compound of the formula

and converting the reaction product into a dye when B represents a radical capable of the formation of a methine dye.

Another mode of operation of the process consists in reacting 1 mole of a compound of the formula

with $n$ moles of a compound of the formula $$R_1\text{—NH—HN—}R_3 \quad (VI)$$

quaternizing the reaction product and, when B represents the radical of a compound capable of methine dye formation, converting the reaction product into a methine dye; quaternization and conversion into a methine dye can be carried out in either order.

A third route leading to the new basic dyes of Formula I is as follows: 1 mole of a compound of formula

wherein alkylene may be branched or unbranched and contains 1 to 3 C atoms, is reacted with 1 mole of a compound of the formula $$R_2\text{—NH—NH—}R_3 \quad (VIII)$$

and the reaction product converted into a methine dye when B represents a radical capable of methine dye formation, or 1 mole of a compound of the formula

is reacted with 1 mole of a compound of the formula $$R_2\text{—NH—NH—}R_3 \quad (VIII)$$

and the reaction product converted into a methine dye when B represents the radical of a dye capable of methine dye formation.

A further preferred mode of operation of the process for the production of the new basic dyes is characterised by reacting 1 mole of an amine of the formula

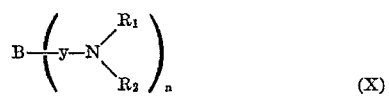

with $n$ moles of a halogen amine and, when B represents a radical capable of methine dye formation, converting the reaction product into a dye; or by reacting 1 mole of a compound of the formula

with $n$ moles of a halogen amine, quaternizing the reaction product and, when B represents a radical capable of methine dye formation, converting the product into a methine dye; or by reacting 1 mole of a compound of the formula $$B\text{(}y\text{—}NH_2\text{)}_n \quad (XII)$$

with $n$ moles of a halogen amine, quaternizing the reaction product and converting the product into a methine dye when B stands for a radical capable of methine dye formation. In the two latter modes of operation quaternization and conversion into a dye can be carried out in either order.

Alkylating agents which are suitable for converting the reaction products of the compounds of Formulae X, XI or XII and halogen amine, or of a compound of Formula IV and a compound of Formula VI into the dye salts obtainable by the present process are e.g. the esters of strong mineral acids and organic sulfonic acids, alkyl chlorides, alkyl bromides and alkyl iodides, aralkyl halides, α-halogenated esters of low molecular fatty acids, dialkyl sulfates, alkyl esters of low molecular alkanesulfonic acids, e.g. methane-, ethane- or butane-sulfonic acids, the esters of benzene-sulfonic acids which may be further substituted, such as methyl, ethyl, propyl and n-butyl esters of benzenesulfonic acid, 2- or 4-methylbenzenesulfonic acid, 4-chlorobenzenesulfonic acid or 3- or 4-nitrobenzenesulfonic acid, methylchloride, methylbromide, methyliodide or dimethylsulfate, methyl esters of low molecular alkanesulfonic acids or benzene sulfonic acids.

Alkylation or quaternization is carried out preferably in an inert solvent, or in aqueous suspension, or without solvent in an excess of the alkylating agent and at increased temperatures with the addition of a buffering agent if necessary.

The anion or anions X may be organic or inorganic ions, e.g. the ions of methyl sulfate, sulfate, disulfate, perchlorate, chloride, bromide, iodide, phosphorus molybdate, phosphorus tungsten molybdate, benzene sulfonate or 4-chlorobenzene sulfonate.

The following are highly suitable as bridge member $R_{14}$: a substituted or unsubstituted methylene group or a divalent or trivalent radical bound to the adjacent N through this group, e.g. —(CH$_2$)$_p$— where $p$ is the number 1 to 6,

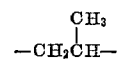

etc.

$R_1$ and $R_2$ together with the adjacent N can form a heterocyclic ring system without $y$, e.g. a pyrrolidine, piperidine, morpholine or piperazine ring, or a ethylene imine grouping etc.

Examples of suitable acid radicals E are those of sulfuric acid (E=SO$_4$H), a sulfonic acid (E=SO$_3$R where R is a substituted or unsubstituted hydrocarbon radical), and hydrogen sulfide (E=SH), but preferably the radicals of the halogen hydracids (E=Cl, Br, etc.) are employed.

The reaction of a compound of Formula IV with a hydrazine of the Formula V or VI, or a compound of Formula VII or IX with a hydrazine of Formula VIII can be effected in an organic solvent and at temperatures of —50° C. to +250° C. The reaction can also be carried out in aqueous medium, if necessary with the addition of an organic solvent, or without solvent at the above-stated temperatures.

The reaction of an amine of Formulae X, XI or XII with a halogenamine is carried out preferably in an organic solvent and at temperatures of −50° C. to +80° C. The reaction can also be effected in aqueous medium, if necessary with the addition of an organic solvent, at the above-stated temperatures.

The halogenamine can be employed either in gaseous form or in solution in an organic solvent, in water, or in a solvent-water mixture.

The dyes formed are separated by one of the basic operations such as filtration, evaporation and filtration, precipitation from a suitable medium and filtration.

The new dyes are excellent for dyeing, padding and printing materials of polymers composed of more than 80% acrylonitrile, e.g. polyacrylonitrile, e.g. Orlon (registered trademark), and copolymers composed of 80–90% acrylonitrile and 20–10% vinyl acetate, methyl acrylate or methyl methacrylate.

These products are marketed under the following names, most of which are registered trademarks: Acrilan (the copolymer of 85% acrylonitrile and 15% vinyl acetate or vinyl pyridine), Orlon, Dralon, Courtelle, Crylor, Dynel, etc.

The dyeings on these materials obtained with the dyes of the process possess good fastness to light, washing, perspiration, sublimation, pleating, decatizing, pressing, water, sea water, bleaching, dry cleaning, cross dyeing and solvents. The dyes are well soluble in water.

The dyes of the present process are dyed to best advantage from aqueous medium, and it is preferable for the medium to be neutral or acid and of boiling temperature.

The commercially available retarding agents can be used in dyeing without adverse effect, although the new dyes produce perfectly level dyeings on the above-named polymers and copolymers without the addition of these agents. The dyes can be applied in closed equipment and under pressure, as they are highly stable in water to prolonged boiling. They also give very good dyeings on blended fabrics containing a polyacrylonitrile fiber or acrylonitrile copolymer fiber as one of the components. A selected number of the new dyes are suitable for dyeing polyacrylonitrile in the mass in shades fast to light and wet treatments. The dyes of the present process which possess good solubility in organic solvents are suitable for the coloration of oils, paint and lacquer media, and plastics, and for the dyeing of fiber-forming materials in the spinning solution. They have many other uses, for example, the dyeing of tannin-treated cotton, wool, silk, regenerated cellulose, synthetic polyamide fibers, and paper, at all stages of manufacture. It has been found that mixtures of two or more dyes of Formula I can be used with good success.

The new dyes are well suited for combination, so that dye salts of the same or different dye classes can be used for producing widely different shades.

In the following, $K_1$ represents the grouping

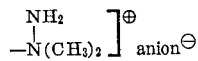

Any one of the following symbols can replace $K_1$ in the disclosed dyes:

$K_2$ the grouping

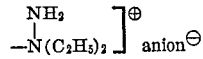

$K_3$ the grouping

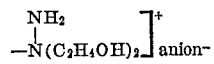

$K_4$ the grouping

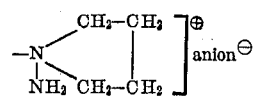

$K_5$ the grouping

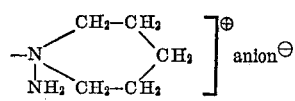

$K_6$ the grouping

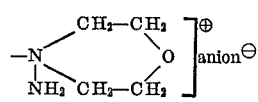

$K_7$ the grouping

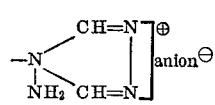

It may therefore be noted as fundamental that in these dyes the symbol K with a given number may in each instance be exchanged for any other symbol K having a number different from it.

Example 1

35 parts of the dye

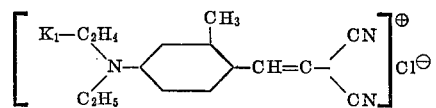

20 parts of Glauber's salt and 45 parts of polyvinyl alcohol are ground in a roller mill for 48 hours. 1.5 parts of this mixture are suspended in 3000 parts of water at 40° and dissolved. 5 parts of glacial acetic acid are then added. 100 parts of well scoured polyacrylonitrile fabric of type "Orlon" 42 (registered trademark) are entered in this bath at 50°, the temperature brought to the boil at an even rate within 45 minutes, and dyeing continued at the boil for 1 hour. The material is subsequently rinsed, soaped at the boil for 20 minutes in a bath containing 1 g./l. of a nonionic detergent, rinsed again and dried. A brilliant green-yellow dyeing is obtained which has good all-round properties. Equally fast dyeings are obtained with dyes of the following constitution:

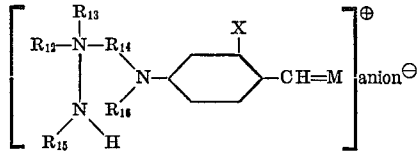

TABLE

| Example No. | $R_{12}$ | $R_{13}$ | $R_{14}$ | $R_{15}$ | $R_{16}$ | X | M | Shade |
|---|---|---|---|---|---|---|---|---|
| 2 | $CH_3$ | $CH_3$ | $C_2H_4$ | H | $C_2H_5$ | $CH_3$ | $=C(CN)(COO-CH_3)$ | Yellow. |
| 3 | $CH_3$ | $CH_3$ | $C_2H_4$ | H | $C_2H_5$ | H | $=C(CN)(COO-C_2H_4-CN)$ | Do. |
| 4 | $CH_3$ | $CH_3$ | $C_2H_4$ | $CH_3$ | $C_2H_5$ | $OCH_3$ | $=C(CN)(SO_2-CH_3)$ | Do. |
| 5 | $CH_3$ | $CH_3$ | $C_2H_4$ | $CH_3$ | $C_2H_5$ | $OCH_3$ | $=C(CN)(SO_2-C_6H_4-CH_3)$ | Do. |
| 6 | $CH_3$ | $CH_3$ | $C_2H_4$ | $CH_3$ | $C_2H_5$ | $OCH_3$ | $=C(CN)(SO_2-\text{naphthyl})$ | Do. |
| 7 | $CH_3$ | $CH_3$ | $C_2H_4$ | $CH_3$ | $C_2H_5$ | Cl | $=C(CO-CH_3)(SO_2-C_6H_4-CH_3)$ | Do. |
| 8 | $CH_3$ | $CH_3$ | $C_2H_4$ | $CH_3$ | $C_2H_5$ | $CH_3$ | =C—C(CH_3)=N—NH—CO (pyrazolone ring) | Do. |
| 9 | $CH_3$ | $CH_3$ | $C_2H_4$ | $CH_3$ | $C_2H_5$ | $CH_3$ | =C(CO-)(CO-)-phenylene | Do. |
| 10 | $CH_3$ | $CH_3$ | $C_2H_4$ | $CH_3$ | $C_2H_5$ | $CH_3$ | =C(CO-)(CO-)-naphthylene | Do. |
| 11 | $CH_3$ | $CH_3$ | $C_2H_4$ | $CH_3$ | $C_2H_5$ | $CH_3$ | =CH-indolenine (3,3-diCH_3, N-CH_3) | Reddish-yellow. |
| 12 | $CH_3$ | $CH_3$ | $C_2H_4$ | H | $C_2H_5$ | $CH_3$ | $=C(CN)(SO_2-C_6H_4-CH_3)$ | Yellow. |
| 13 | $C_2H_5$ | $C_2H_5$ | $C_2H_4$ | H | $C_2H_5$ | $CH_3$ | $=C(CN)(COO-CH_3)$ | Do. |
| 14 | $C_2H_5$ | $C_2H_5$ | $C_2H_4$ | H | $C_2H_5$ | H | $=C(CN)(COO-C_2H_4-CN)$ | Do. |
| 15 | $C_2H_5$ | $C_2H_5$ | $C_2H_4$ | $C_2H_5$ | $C_2H_5$ | $OCH_3$ | $=C(CH)(SO_2-CH_3)$ | Do. |

TABLE—Continued

| Example No. | $R_{12}$ | $R_{13}$ | $R_{14}$ | $R_{15}$ | $R_{16}$ | X | M | Shade |
|---|---|---|---|---|---|---|---|---|
| 16 | $C_2H_5$ | $CH_3$ | $C_2H_4$ | $CH_3$ | $C_2H_5$ | $OCH_3$ | =C(CN)(SO_2-C_6H_4-CH_3) | Yellow. |
| 17 | $C_2H_5$ | $CH_3$ | $C_2H_4$ | H | $C_2H_5$ | $OCH_3$ | =C(CN)(SO_2-naphthyl) | Do. |
| 18 | $C_2H_5$ | $C_2H_5$ | $C_2H_4$ | $C_2H_5$ | $C_2H_5$ | Cl | =C(CO-CH_3)(SO_2-C_6H_4-CH_3) | Do. |
| 19 | $C_2H_5$ | $C_2H_5$ | $C_2H_4$ | $C_2H_5$ | $C_2H_5$ | $CH_3$ | =C—C(CH_3)=N—NH—CO (triazolone) | Do. |
| 20 | $C_2H_5$ | $C_2H_5$ | $C_2H_4$ | $C_2H_5$ | $C_2H_5$ | $CH_3$ | =C(CO-O-)(CO-) benzene dicarboxy | Do. |
| 21 | $C_2H_5$ | $C_2H_5$ | $C_2H_4$ | $C_2H_5$ | $C_2H_5$ | $CH_3$ | =C(CO-O-)(CO-) naphthalene dicarboxy | Do. |
| 22 | $C_2H_5$ | $C_2H_5$ | $C_2H_4$ | $C_2H_5$ | $C_2H_5$ | $CH_3$ | =CH-(3,3-dimethyl-1-methyl indoline) | Reddish yellow. |
| 23 | $C_2H_5$ | $C_2H_5$ | $C_2H_4$ | H | $C_2H_5$ | $CH_3$ | =C(CN)(SO_2-C_6H_4-CH_3) | Yellow. |

As examples of further dyes the following may be named:

(24)
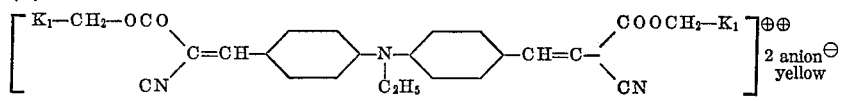
2 anion⊖ yellow

(25)
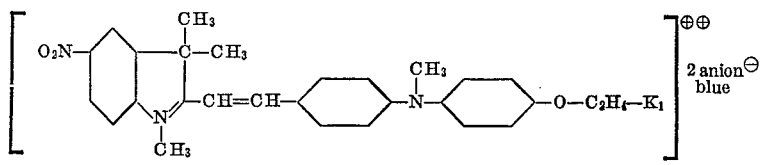
2 anion⊖ blue

What is claimed is:

1. A dyestuff of the formula free from carboxylic acid and sulfonic acid groups:

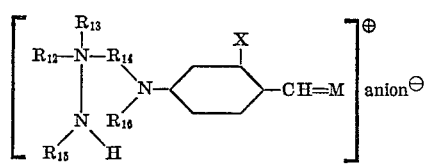

wherein

X is a member selected from the group consisting of a hydrogen atom, lower alkyl, lower alkoxy and a halogen atom, $R_{12}$ taken alone is lower alkyl, $R_{13}$ taken alone is lower alkyl, $R_{12}$ and $R_{13}$ taken together with the adjacent N-atom represent 1,2,4-triazolo, pyrrolidino, piperidino or morpholino, $R_{14}$ is lower alkylene, $R_{15}$ is a member selected from the group consisting of a hydrogen atom and lower alkyl,
$R_{16}$ is lower alkyl, and
M is

wherein
  $R_1$ taken alone is a member selected from the group consisting of H, —CN and —CO—CH$_3$,
  $R_2$ taken alone is a member selected from the group consisting of —CN, —COO—CH$_3$,
    —COO—C$_2$H$_4$—CN, SO$_2$CH$_3$,

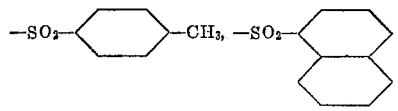

and 1,3,3-trimethylindoleninium, and
$R_1$ and $R_2$ together with the adjacent carbon atom represent pyrazolonyl,

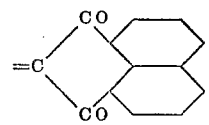

or

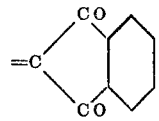

2. The basic dyestuff of the formula

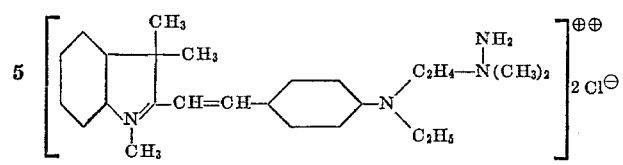

References Cited

UNITED STATES PATENTS

| | | | |
|---|---|---|---|
| 2,179,895 | 11/1939 | Muller et al. | 260—240.9 |
| 2,230,789 | 2/1941 | Winter et al. | 260—240.9 |
| 2,955,108 | 10/1960 | Omietanski | 260—205 |
| 3,190,871 | 6/1965 | Auerbach et al. | 260—146 |
| 3,206,451 | 9/1965 | Benz et al. | 260—153 |
| 3,252,967 | 5/1966 | Entschel et al. | 260—158 |
| 2,834,793 | 5/1958 | Livingston et al. | 260—397.7 |
| 2,834,794 | 5/1958 | Sterling et al. | 260—397.7 |

FOREIGN PATENTS

| | | |
|---|---|---|
| 721,495 | 1/1955 | Great Britain. |

JOHN D. RANDOLPH, Primary Examiner

U.S. Cl. X.R.

8—55, 62; 260—247.1, 247.2, 293.4, 294.3, 308, 326.85, 465, 567.6